US009812067B2

(12) United States Patent
Yang et al.

(10) Patent No.: US 9,812,067 B2
(45) Date of Patent: Nov. 7, 2017

(54) ORGANIC LIGHT-EMITTING DISPLAY DEVICE AND DRIVING METHOD THEREOF

(71) Applicant: SAMSUNG DISPLAY CO., LTD., Yongin, Gyeonggi-Do (KR)

(72) Inventors: Su Min Yang, Goyang-si (KR); Sung Hoon Bang, Seoul (KR); Young Wook Yoo, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 221 days.

(21) Appl. No.: 14/692,547

(22) Filed: Apr. 21, 2015

(65) Prior Publication Data

US 2016/0171934 A1 Jun. 16, 2016

(30) Foreign Application Priority Data

Dec. 15, 2014 (KR) ........................ 10-2014-0180364

(51) Int. Cl.
*G06F 3/038* (2013.01)
*G09G 5/00* (2006.01)
(Continued)

(52) U.S. Cl.
CPC ......... *G09G 3/3291* (2013.01); *G09G 3/3258* (2013.01); *G09G 2320/045* (2013.01);
(Continued)

(58) Field of Classification Search
CPC ............... G09G 3/3291; G09G 3/3258; G09G 2360/145; G09G 2360/16; G09G 2330/12; G09G 2320/045
See application file for complete search history.

(56) References Cited

U.S. PATENT DOCUMENTS

2014/0168192 A1* 6/2014 Jeong .................. G09G 3/3208 345/212
2014/0176409 A1* 6/2014 Kim .................... G09G 3/3233 345/92
(Continued)

FOREIGN PATENT DOCUMENTS

JP 2006-195312 A 7/2006
KR 10-2005-0026338 A 3/2005
(Continued)

OTHER PUBLICATIONS

U.S. Office action dated Jul. 1, 2016, for cross reference U.S. Appl. No. 14/619,033, 16 pages.
(Continued)

*Primary Examiner* — Ilana Spar
*Assistant Examiner* — Brent D Castiaux
(74) *Attorney, Agent, or Firm* — Lewis Roca Rothgerber Christie LLP

(57) ABSTRACT

An organic light-emitting display device, including a display unit including a plurality of pixels each having an organic light-emitting diode (OLED), a controller configured to accumulate image data of each frame and to generate compensated image data using a degradation compensation method determined, based on the accumulated image data, to compensate for the degradation of the OLED of each of the pixels, and a data driver configured to generate a data voltage according to the compensated image data and to provide the data voltage to the pixels.

17 Claims, 6 Drawing Sheets

(51) Int. Cl.
*G09G 3/3291* (2016.01)
*G09G 3/3258* (2016.01)

(52) U.S. Cl.
CPC ... *G09G 2330/12* (2013.01); *G09G 2360/145* (2013.01); *G09G 2360/16* (2013.01)

(56) References Cited

U.S. PATENT DOCUMENTS

| | | | | |
|---|---|---|---|---|
| 2014/0176617 | A1 | 6/2014 | Jeong et al. | |
| 2015/0130866 | A1 | 5/2015 | Bae et al. | |
| 2015/0193905 | A1 | 7/2015 | Lee et al. | |
| 2016/0140901 | A1* | 5/2016 | Bae | G09G 3/3233 345/212 |

FOREIGN PATENT DOCUMENTS

| | | | |
|---|---|---|---|
| KR | 10-2006-0112993 | A | 11/2006 |
| KR | 10-2006-0112995 | A | 11/2006 |
| KR | 10-2009-0058788 | A | 6/2009 |
| KR | 10-2013-0002118 | A | 1/2013 |
| KR | 10-2013-0064552 | A | 6/2013 |
| KR | 10-2014-0000787 | | 1/2014 |
| KR | 10-2014-0056799 | A | 5/2014 |
| KR | 10-2015-0054124 | | 5/2015 |
| KR | 10-2015-0081123 | | 7/2015 |

OTHER PUBLICATIONS

U.S. Office action dated Dec. 15, 2016, for cross reference U.S. Appl. No. 14/619,033, 14 pages.
U.S. Office action dated Mar. 24, 2017, for cross reference U.S. Appl. No. 14/619,033, 2 pages.

* cited by examiner

ORGANIC LIGHT-EMITTING DISPLAY DEVICE AND DRIVING METHOD THEREOF

This application claims priority to and the benefit of Korean Patent Application No. 10-2014-0180364 filed on Dec. 15, 2014 in the Korean Intellectual Property Office, the disclosure of which is incorporated herein by reference in its entirety.

BACKGROUND

1. Field

Aspects of embodiments of the invention relates to an organic light-emitting display device and a driving method thereof.

2. Description of the Related Art

Recently, various flat panel display devices capable of addressing the shortcomings of cathode ray tubes (CRTs) such as heavy weight and volume are being developed. Examples of flat panel display devices include liquid crystal display (LCD) devices, field emission display (FED) devices, plasma display panel (PDP) devices and organic light-emitting display devices.

Organic light-emitting display devices display an image by using organic light-emitting diodes (OLEDs), which generate light through the recombination of electrons and holes. Organic light-emitting display devices provide various benefits, such as fast response speed and low power consumption.

To achieve uniform picture quality, the pixel circuitry of an organic light-emitting display device compensates for differences in properties between the thin-film transistors (TFTs) of pixels. Also, since the efficiency of OLEDs decreases over time due to the degradation of the organic material used in the OLEDs, the luminance of the OLEDs decreases. That is, as the OLEDs continue to be degraded, the resistance of the OLEDs continues to increases. As a result, a current flowing in each of the OLEDs decreases, and the luminance of the OLEDs decreases.

SUMMARY

Aspects of embodiments of the present invention are directed to an organic light-emitting display device capable of improving (e.g., reducing) luminance deterioration and irregularity that may be caused by the degradation of organic light-emitting diodes (OLEDs).

Aspects of embodiments of the present invention also provide a driving method of an organic light-emitting display device capable of improving (e.g., reducing) luminance deterioration and irregularity that may be caused by the degradation of OLEDs.

However, exemplary embodiments of the invention are not restricted to those set forth herein. The above and other exemplary embodiments of the invention will become more apparent to one of ordinary skill in the art to which the invention pertains by referencing the detailed description of the invention given below.

According to an exemplary embodiment of the invention, there is provided an organic light-emitting display device, including: a display unit including a plurality of pixels each having an organic light-emitting diode (OLED); a controller configured to accumulate image data of each frame and to generate compensated image data using a degradation compensation method determined, based on the accumulated image data, to compensate for the degradation of the OLED of each of the pixels; and a data driver configured to generate a data voltage according to the compensated image data and to provide the data voltage to the pixels.

In an embodiment, the organic light-emitting display device further includes: a sensor configured to generate sensing data by sensing a degree of the degradation of the OLED of each of the pixels, wherein the controller is configured to determine at least one of a first compensation method and a second compensation method as the degradation compensation method based on the accumulated image data, wherein the first compensation method uses the sensing data and the second compensation method uses the accumulated image data.

In an embodiment, the controller is configured to determine both the first and second compensation methods as the degradation compensation method in response to the accumulated image data being greater than first reference data and less than second reference data.

In an embodiment, the controller is configured to determine the first compensation method as the degradation compensation method in response to the accumulated image data being less than the first reference data, and to determine the second compensation method as the degradation compensation method in response to the accumulated image data being greater than the second reference data, wherein the second reference data is greater than the first reference data.

In an embodiment, in response to the first and second compensation methods both being determined as the degradation compensation method, the controller is further configured to calculate a final compensation amount by adding up a compensation amount produced by the first compensation method and a compensation amount produced by the second compensation method according to a rate calculated based on the accumulated image data, and to generate the compensated image data using the final compensation amount.

In an embodiment, the rate is calculated by dividing a difference between the accumulated image data and the first reference data by a difference between the second reference data and the first reference data.

In an embodiment, the sensor is configured to generate the sensing data by applying a sensing voltage to each of the pixels and measuring a current flowing in the OLED of each of the pixels according to the sensing voltage.

In an embodiment, the organic light-emitting display device further includes: a sensor configured to generate sensing data by sensing a degree of the degradation of the OLED of each of the pixels, wherein the controller is configured to switch from a first compensation method to a second compensation method, in response to the accumulated image data continuing to be accumulated, wherein the first compensation method uses the sensing data and the second compensation method uses the accumulated image data.

In an embodiment, the controller is configured to provide a transitional period during which the first and second compensation methods are both used during the switching from the first compensation method to the second compensation method.

In an embodiment, the controller includes an image processor and an image compensator, wherein the image processor is configured to process an image signal provided thereto from an external source into the image data, and the image compensator is configured to generate the compensated image data by compensating for the image data.

In an embodiment, the image compensator includes a data accumulator and a compensation method determiner, wherein the data accumulator is configured to store the image data therein, and the compensation method determiner is configured to determine the degradation compensation method according to the accumulated image data.

According to an exemplary embodiment of the invention, there is provided a driving method of an organic light-emitting display device including a plurality of pixels each having an OLED, the driving method including: accumulating image data of each frame and determining a degradation compensation method based on the accumulated image data; calculating a compensation amount for each of the pixels based on the determined degradation compensation method; generating compensated image data by compensating for the image data according to the calculated compensation amount; and generating a data voltage based on the compensated image data.

In an embodiment, the determining the degradation compensation method includes determining at least one of a first compensation method and a second compensation method as the degradation compensation method to be used based on the accumulated image data, and wherein the first compensation method uses sensing data obtained by measuring a degree of degradation of the OLED of each of the pixels, and the second compensation method uses the accumulated image data.

In an embodiment, both the first and second compensation methods are determined as the degradation compensation method to be used in response to the accumulated image data being greater than first reference data and less than second reference data.

In an embodiment, the first compensation method is determined as the degradation compensation method to be used in response to the accumulated image data being less than first reference data, and the second compensation method is determined as the degradation compensation method to be used in response to the accumulated image data being greater than second reference data, wherein the second reference data is greater than the first reference data.

In an embodiment, in response to the first and second compensation methods both being determined as the degradation compensation method to be used, a final compensation amount is calculated by adding up a compensation amount produced by the first compensation method and a compensation amount produced by the second compensation method according to a rate calculated based on the accumulated image data, and the compensated image data is generated using the final compensation amount.

In an embodiment, the rate is calculated by dividing a difference between the accumulated image data and first reference data by a difference between second reference data and the first reference data.

In an embodiment, the driving method further includes: switching from a first compensation method to a second compensation method, wherein the first compensation method uses sensing data that is obtained by measuring a degree of degradation of the OLED of each of the pixels, and the second compensation method uses the accumulated image data, in response to the accumulated image data continuing to be accumulated.

In an embodiment, the switching from the first compensation method to the second compensation method includes providing a transitional period during which the first and second compensation methods are both used during the switching from the first compensation method to the second compensation method.

In an embodiment, the sensing data is obtained by applying a sensing voltage to each of the pixels and measuring a current flowing in the OLED of each of the pixels according to the sensing voltage.

According to the exemplary embodiments, it is possible to collect precise degradation information from an organic light-emitting display device.

Also, it is possible to improve (e.g., reduce or compensate for) luminance deterioration and irregularity by performing degradation compensation based on the collected degradation information.

Other features and exemplary embodiments will be apparent from the following detailed description, the drawings, and the claims.

DETAILED DESCRIPTION OF THE EMBODIMENTS

Figure 1:
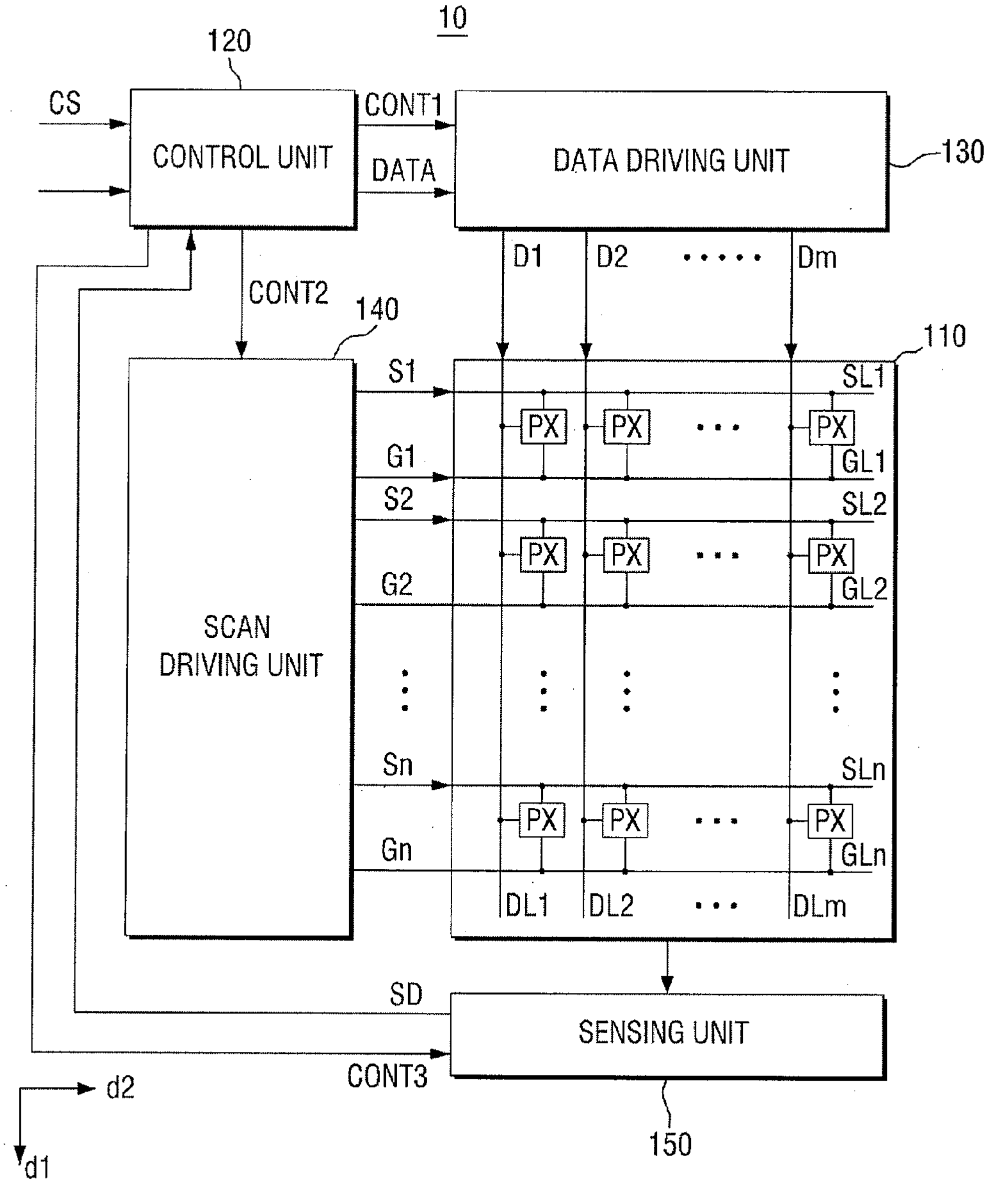
FIG. 1 is a block diagram of an organic light-emitting display device according to an exemplary embodiment of the present invention.

Aspects and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the present invention to those skilled in the art, and the present invention will be defined by the appended claims, and equivalents thereof. Like reference numerals refer to like elements throughout the specification.

The terminology used herein is for the purpose of describing particular embodiments and is not intended to be limiting of the present invention. As used herein, the singular forms “a” and “an” are intended to include the plural forms as well, unless the context clearly indicates otherwise. It will be further understood that the terms “include,” “including,” “comprises,” and/or “comprising,” when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being “on”, “connected to” or “coupled to” another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the inventive concept." Also, the term "exemplary" is intended to refer to an example or illustration.

As used herein, the term "substantially," "about," and similar terms are used as terms of approximation and not as terms of degree, and are intended to account for the inherent variations in measured or calculated values that would be recognized by those of ordinary skill in the art.

As used herein, the terms "use," "using," and "used" may be considered synonymous with the terms "utilize," "utilizing," and "utilized," respectively.

The organic light-emitting display device and/or any other relevant devices or components according to embodiments of the present invention described herein may be implemented utilizing any suitable hardware, firmware (e.g. an application-specific integrated circuit), software, or a suitable combination of software, firmware, and hardware. For example, the various components of the organic light-emitting display device may be formed on one integrated circuit (IC) chip or on separate IC chips. Further, the various components of the organic light-emitting display device may be implemented on a flexible printed circuit film, a tape carrier package (TCP), a printed circuit board (PCB), or formed on a same substrate. Further, the various components of the organic light-emitting display device may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the exemplary embodiments of the present invention.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, these embodiments should not be construed as limited to the particular shapes of regions illustrated herein. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Exemplary embodiments will hereinafter be described with reference to the accompanying drawings.

Figure 2:
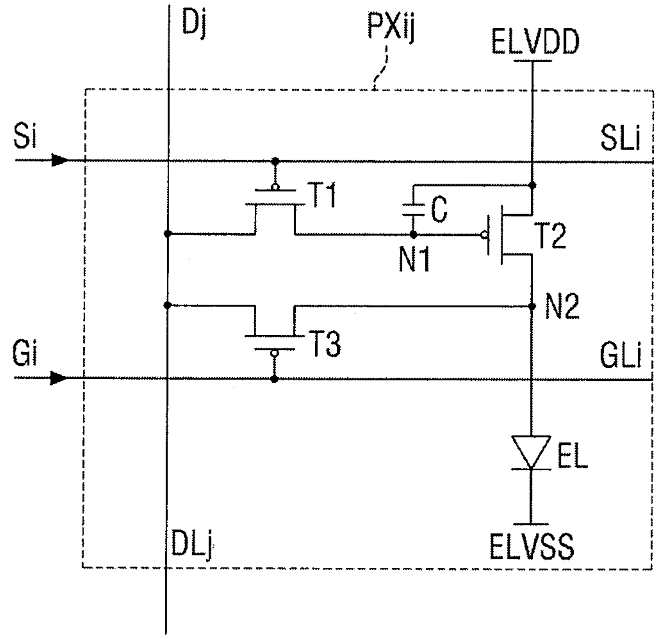
FIG. 2 is a circuit diagram of a pixel of the organic light-emitting display device according to an exemplary embodiment of the present invention.

FIG. 1 is a block diagram of an organic light-emitting display device according to an exemplary embodiment of the present invention, and FIG. 2 is a circuit diagram of a pixel of the organic light-emitting display device according to an exemplary embodiment of the present invention.

Referring to FIGS. 1 and 2, an organic light-emitting display device 100 includes a display unit 110, a control unit (e.g., a controller) 120, a data driving unit (e.g., a data driver) 130, a scan driving unit (e.g., a scan driver) 140, and a sensing unit (e.g., a sensor) 150.

The display unit 110 may be a region where an image is displayed. The display unit 110 may include a plurality of scan lines SL1 through SLn (where n is a natural number greater than 1), a plurality of data lines DL1 through DLm (where m is a natural number greater than 1), which cross the scan lines SL1 through SLn, and a plurality of pixels PX, which are defined by the scan lines SL1 through SLn and the data lines DL1 through DLm. The data lines DL1 through DLm may cross, and may be insulated from, the scan lines SL1 through SLn. That is, the data lines DL1 through DLm may extend in a first direction d1, and the scan lines SL1 through SLn may extend in a second direction d2, which intersects the first direction d1. The first direction d1 may be a column direction, and the second direction d2 may be a row direction. The display unit 110 may also include a plurality of sensing control lines GL1 through GLn. The sensing control lines GL1 through GLn may extend to correspond to the scan lines SL1 through SLn, respectively. That is, the sensing control lines GL1 through GLn, like the scan lines SL1 through SLn, may extend in the second direction d2.

The pixels PX may be arranged in a matrix form. Each of the pixels PX may be defined by one of the scan lines SL1 through SLn, one of the data lines DL1 through DLm, and one of the sensing control lines GL1 through GLn. That is, each of the pixels PX may be connected to one of the scan lines SL1 through SLn, one of the data lines DL1 through DLm, and one of the sensing control lines GL1 through GLn. Each of the pixels PX may include at least one organic light-emitting diode (OLED) "EL". Accordingly, each of the pixels may emit light with a brightness corresponding to a data voltage provided thereto via one of the data lines DL1 through DLm in response to receipt of a scan signal via one of the scan lines SL1 through SLn. Degradation information (e.g., level of degradation) of the OLED "EL" may be sensed by a transistor that is turned on by one of the sensing control lines GL1 through GLn.

FIG. 2 illustrates the circuitry of any one of the pixels PX included in the display unit 110. That is, FIG. 2 illustrates the structure of a pixel PX connected to an i-th scan line SLi and a j-th data line DLj, however, the structure of the pixels PX is not limited to that set forth in FIG. 2. Referring to FIG. 2, the pixel PX may include a first transistor T1, a second transistor T2, a third transistor T3, a first capacitor C1, and an OLED "EL".

The first transistor T1 may include a gate electrode connected to the i-th scan line SLi, a first electrode connected to the j-th data line DLj, and a second electrode connected to a first node N1. The first transistor T1 may be turned on by an i-th scan signal Si of a gate-on voltage, which is applied to the i-th scan line SLi, and may transmit a j-th data voltage Dj, which is applied to the j-th data line DLj, to the first node N1. The first transistor T1 may be a switching transistor selectively providing the j-th data voltage Dj to a driving transistor. In an exemplary embodiment, the first, second and third transistors T1, T2 and T3 may be p-channel field effect transistors (FETs). That is, the first transistor T1 may be turned on by a scan signal of a low-level voltage, and may be turned off by a scan signal of a high-level voltage. However, the present invention is not limited to this exemplary embodiment. That is, in an alternative exemplary embodiment, the first, second and third transistors T1, T2, and T3 may be n-channel FETs.

The second transistor T2 may include a gate electrode connected to the first node N1, a first electrode connected to the first power supply voltage ELVDD and a second electrode connected to a second node N2. The first capacitor C1 may be located between the first node N1 and the first power supply voltage ELVDD. The first capacitor C1 may be charged with the j-th data voltage Dj, and the data voltage that the first capacitor C1 is charged with may be provided to the gate electrode of the second transistor T2. The anode electrode of the OLED "EL" may be connected to a third node N3. The second transistor T2 may be a driving transistor, and may control a driving current applied from the first power supply voltage ELVDD to the OLED "EL" according to the voltage of the first node N1.

The OLED "EL" may include an anode electrode connected to the second node N2, a cathode electrode connected to the second power supply voltage ELVSS, and an organic light-emitting layer. The organic light-emitting layer may emit light of one of three primary colors, that is, red, green, and blue. A desired color may be represented by a spatial or temporal sum of the three primary colors. The organic light-emitting layer may include a low-molecular organic material or a high-molecular organic material corresponding to each color. The organic material corresponding to each color may generate and emit light according to the amount of current flown in (e.g., passing through) the organic light-emitting layer.

The third transistor T3 may include a gate electrode connected to a j-th sensing control line GLj, a first electrode connected to the j-th data line DLj, and a second electrode connected to the second node N2. An i-th sensing control signal Gi may be provided when a sensing mode is activated. During the sensing mode, a sensing voltage Vgp with a preset or predetermined level may be provided to the gate electrode of the second transistor T2, and a current with a preset or predetermined level may be generated due to the sensing voltage Vgp. The sensing voltage Vgp may be provided via the j-th data line DLj, however, the present invention is not limited thereto. That is, the sensing voltage Vgp may be provided via a line other than a data line. The amount of current flowing in the OLED "EL" may be reduced, and may be varied depending on the degree of degradation of the OLED "EL". That is, degradation information (e.g., level of degradation) of the OLED "EL" may be measured by sensing the amount of current flowing into the OLED "EL". A current flowing into the third node N3 may be measured via the third transistor T3. For example, the current flowing into the third node N3 may be measured via the j-th data line DLj, which is connected to the first electrode of the third transistor T3, however, the present invention is not limited thereto. The measurement of the current flowing into the third node N3 will be described later in further detail.

The control unit 120 may receive a control signal CS and an image signal "R, G, B". The image signal "R, G, B" may include luminance information of the pixels PX. The luminance information may include a predefined number of gray levels, for example, 1024, 256 or 64 gray levels. The control signal CS may include a vertical synchronization signal Vsync, a horizontal synchronization signal Hsync, a data enable signal DE and a clock signal CLK. The control unit 120 may generate first through third driving control signals CONT1 through CONT3 and image data DATA according to the image signal "R, G, B" and the control signal CS. The control unit 120 may generate the image data DATA by dividing the image signal "R, G, B" in units of frames according to the vertical synchronization signal Vsync and dividing the image signal "R, G, B" in units of the scan lines SL1 through SLn according to the horizontal synchronization signal Hsync. The control unit 120 may compensate for the image data DATA, and may transmit compensated image data DATA1 to the data driving unit 130 together with the first driving control signal CONT1. The generation of the compensated image data DATA1 will be described later in further detail. The control unit 120 may transmit a second driving control signal CONT2 to the scan driving unit 140, and may transmit a third driving control signal CONT3 to the sensing unit 150.

The scan driving unit 140 may be connected to the display unit 110 by the scan lines SL1 through SLn and the sensing control lines GL1 through GLn. The second driving control signal CONT2 may be a signal for controlling the output of a plurality of scan signals S1 through Sn and a plurality of sensing control signals G1 through Gn. The scan driving unit 140 may sequentially apply the scan signals S1 through Sn to the scan lines SL1 through SLn, respectively. The scan driving unit 140 may apply the sensing control signals G1 through Gn to the sensing control lines GL1 through GLn, respectively, to measure degradation information (e.g., measure the level of degradation) of each of the pixels PX of the display unit 110. The sensing control signals G1 through Gn may be provided when the sensing mode is activated. That is, the scan driving unit 140 may provide the sensing control signals G1 through Gn to the display unit 110. For this, the scan driving unit 140 may include a shift register for sequentially applying the scan signals S1 through Sn to the scan lines SL1 through SLn, respectively, a sensing module for applying a sensing control signal to a sensing control line connected to one or more pixels to be measured for a current, and a switching circuit for selecting the shift register or the sensing module through a switching operation.

The data driving unit 130 may be connected to the data lines DL1 through DLm of the display unit 110. The data driving unit 130 may generate a plurality of data voltages D1 through Dm by sampling and holding the compensated image data DATA1 input thereto according to the first driving control signal CONT1 and converting the sampled-and-held image data into analog voltage data. The data driving unit 130 may transmit the data voltages D1 through Dm to the data lines DL1 through DLm, respectively. Each of the pixels PX of the display unit 110 may be turned on by one of the scan signals S1 through Sn with a gate-on voltage and may be provided with one of the data voltages D1 through Dm.

The sensing unit 150 may generate the sensing voltage Vgp with a preset or predetermined level according to the third driving control signal CONT3, and may provide the sensing voltage Vgp to the pixels PX. The sensing unit 150 may be activated by the third driving control signal CONT3. The sensing mode may be performed during the operation of the organic light-emitting display device 10, however, the present invention is not limited thereto. In exemplary embodiments, the sensing unit 150 of the organic light-emitting display device 10 may be activated to generate sensing data while the organic light-emitting display device 10 is being turned on or off.

The sensing unit 150 may provide the sensing voltage Vgp to the data lines DL1 through DLm, however, the present invention is not limited thereto. That is, when the sensing unit 150 provides the sensing voltage Vref, the interconnections from which the data voltages D1 through Dm are output and the data lines DL1 through DLm may be disconnected from each other. As mentioned above, the sensing unit 150 may measure the amount of current flowing in the third node N3. The sensing unit 150 may include a plurality of read-out circuits, which are connected to the data lines DL1 through DLm, respectively, and may measure the amount of current flowing in the OLED "EL" of each of the pixels PX via the data lines DL1 through DLm. The sensing unit 150 may convert the measured amount of current into a digital value. The sensing unit 150 may generate sensing data SD through the mapping of the digital value, and may provide the sensing data SD to the control unit 120. The control unit 120 may generate the compensated image data DATA1 by compensating for the image data DATA based on the sensing data SD. The sensing of degradation information (e.g., level of degradation) by the sensing unit 150 is not limited to the method set forth herein. The generation of the compensated image data DATA1 by the control unit 120 will hereinafter be described in further detail.

Figure 3:
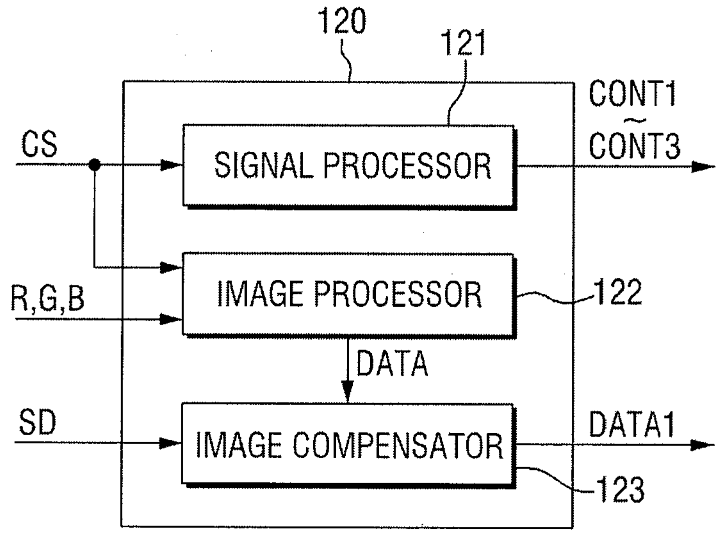
FIG. 3 is a block diagram of a control unit illustrated in FIG. 1.
Figure 4:
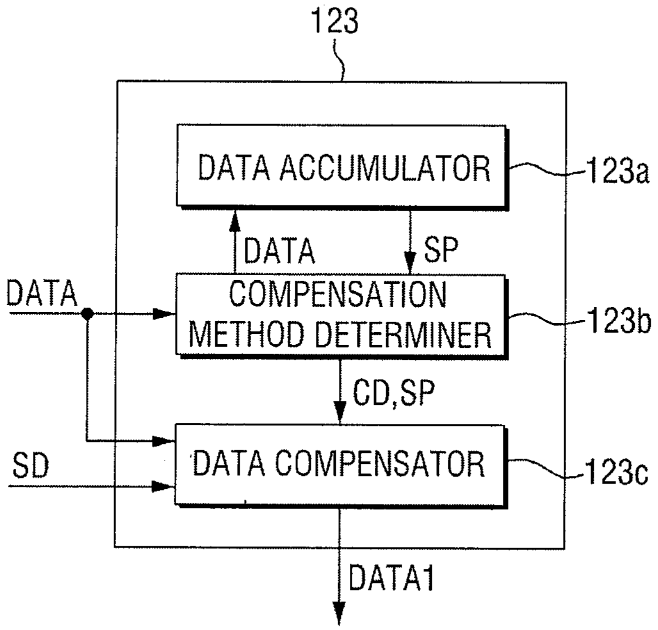
FIG. 4 is a block diagram of an image compensator illustrated in FIG. 3.
Figure 5:
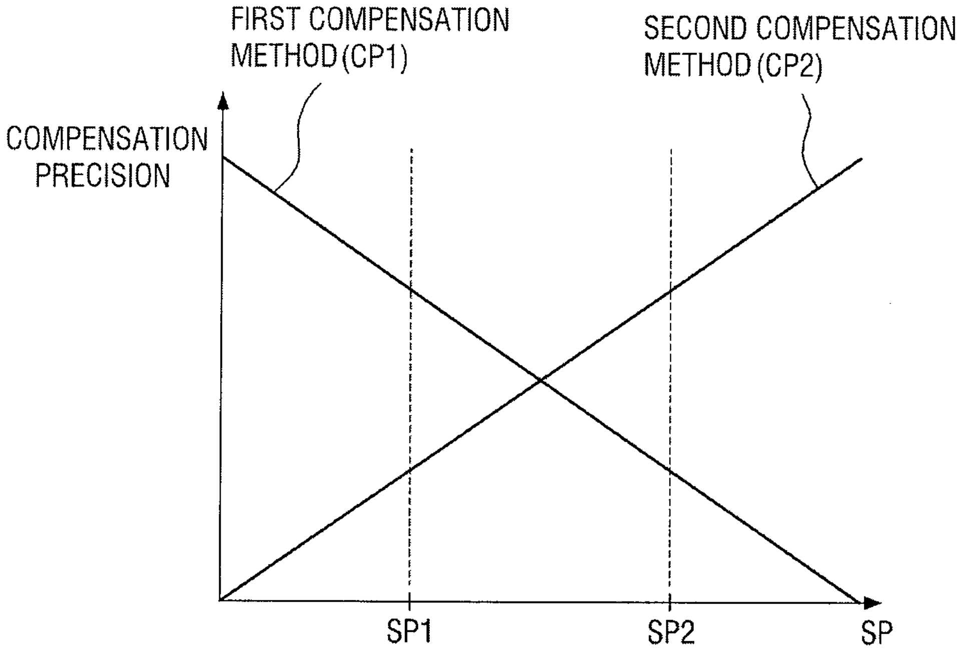
FIG. 5 is a graph illustrating the variation of the compensation precision of first and second compensation methods according to the amount of accumulated data.
Figure 6:
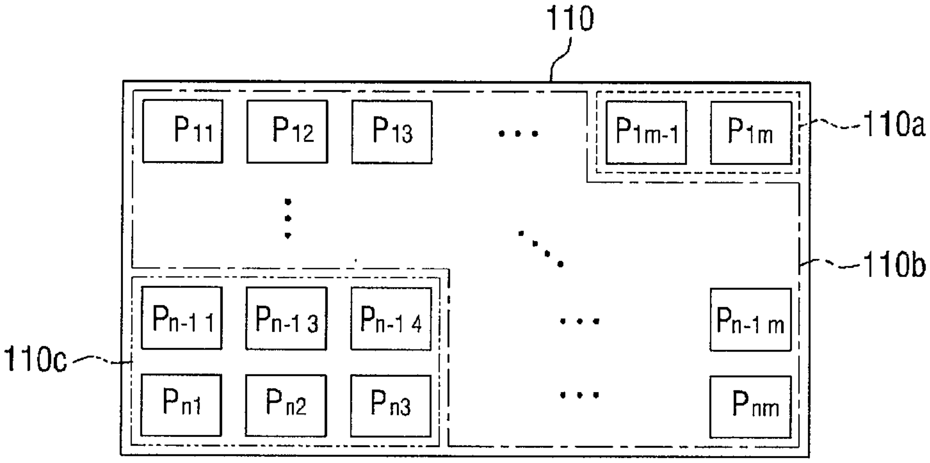
FIG. 6 is a schematic view of a display panel to which different degradation methods can be applied.

FIG. 3 is a block diagram of the control unit illustrated in FIG. 1. FIG. 4 is a block diagram of an image compensator illustrated in FIG. 3. FIG. 5 is a graph illustrating the variation of the compensation precision of first and second compensation methods according to the amount of accumulated data. FIG. 6 is a schematic view of a display panel to which different degradation methods can be applied.

Referring to FIGS. 3 to 6, the control unit 120 may include a signal processor 121, an image processor 122, and an image compensator 123. The signal processor 121 may generate the first, second, and third driving control signals CONT1, CONT2, and CONT3. The image processor 122 may generate the image data DATA by processing the image signal "R, G, B". The image compensator 123 may generate the compensated image data DATA1 by compensating for the image data DATA. The compensated image data DATA1 may be image data obtained by compensating for the degradation of the OLED "EL" of each of the pixels PX. That is, the image compensator 123 may generate the compensated image data DATA1 by compensating for the image data DATA such that a higher voltage can be applied to degraded pixels PX than to non- or less-degraded pixels PX, in consideration that the luminance of the OLED "EL" of each of the pixels decreases over time due to the degradation of the OLED "EL" of each of the pixels PX.

The image compensator 123 may compensate for image data DATA input to each of the pixels PX using at least one compensation method. The image compensator 123 may compensate for the image data DATA using the sensing data SD, which is generated by the sensing unit 150. That is, the image compensator 123 may detect severely degraded pixels PX based on the sensing data SD, and may compensate for image data DATA input to the severely degraded pixels PX to prevent or substantially prevent the occurrence of luminance irregularity.

The image compensator 123 may compensate for the image data DATA using accumulated data SP. The accumulated data SP may be data obtained by accumulating image data DATA of previous frames and a current frame. That is, the image compensator 123 may accumulate the image data DATA of the previous frames and the current frame for each of the pixels PX, and may compensate for image data DATA to be input to each of the pixels PX based on the accumulated data. A large amount of accumulated data SP may mean that the OLED "EL" of each of the pixels PX has emitted light for a long time and the degradation of the OLED "EL" of each of the pixels PX has been continued for a long time, accordingly. The accumulated data SP may vary from one pixel PX to another pixel PX. The image compensator 123 may detect severely degraded pixels PX by analyzing the accumulated data SP, and may compensate for image data DATA to be input to the detected pixels PX to prevent or substantially prevent the occurrence of luminance irregularity.

A stress profiler compensation method using the accumulated data SP is defined as a first compensation method CP1, and a direct measurement-based compensation method using the sensing data SD is defined as a second compensation method CP2. The efficiencies of the first and second compensation methods CP1 and CP2 are as illustrated in FIG. 5.

For example, referring to FIG. 5, a first axis represents accumulated data SP of a single pixel PX, and the accumulated data SP on the first axis, and a large amount of accumulated data SP means that the degradation of the OLED "EL" of the pixel has been continued for a long time. A second axis intersecting the first axis represents the precision of compensation. A stress profiler compensation method using the accumulated data SP, that is, the first compensation method CP1, may have a high compensation precision at an early stage thereof; however, the compensation precision of the stress profiler compensation method may gradually decrease as the amount of accumulated data SP increases. On the other hand, the second compensation method CP2, which involves directly measuring a current from the OLED "EL" of the pixel, may have a low compensation precision at an early stage thereof because of the difficulty of detecting any difference in the amount of current flowing; however, the compensation precision of the second compensation method may gradually increase as the degradation of the OLED "EL" of the pixel progresses.

The image compensator 123 may apply different compensation methods to each of the pixels PX according to the amount of accumulated data SP. In a case when there is only a small amount of accumulated data SP yet, that is, in a case when the OLED "EL" of each of the pixels has not yet been degraded much, the image compensator 123 may apply the first compensation method CP1 to each of the pixels PX. On the other hand, in a case when the OLED "EL" of each of the pixels has been severely degraded, the image compensator 123 may apply the second compensation method CP2 to each of the pixels PX. That is, the image compensator 123 may switch from one compensation method to another switching method according to the amount of accumulated data SP, rather than according to the amount of time for which each of the pixels PX is driven. The degree to which the pixels PX are degraded may be varied according to the amount of time for which each of the pixels PX is driven. Accordingly, a high compensation precision may be provided by switching from one compensation method to another compensation method according to the amount of accumulated data SP, rather than according to the amount of time for which each of the pixels PX is driven. The first and second compensation methods CP1 and CP2 may produce different compensation amounts, and as a result, luminance irregularity may occur during the switching from the first switching method CP1 to the second switching method CP2. To prevent or substantially prevent such luminance irregularity, a transitional period during which the first and second compensation methods CP1 and CP2 may both be used, may be provided during the switching from the first compensation method CP1 to the second switching method CP2. The structure of the image compensator 123 will hereinafter be described.

The image compensator 123 may include a data accumulator 123*a*, a compensation method determiner 123*b*, and a data compensator 123*c*.

The data accumulator 123*a* may be a memory device, and may be a space for storing image data DATA therein. The compensation method determiner 123*b* may store image data DATA of a current frame in the data accumulator 123*a*, and may read out accumulated data SP from the data accumulator 123*a*. The read-out accumulated data SP may be data into which the image data DATA of the current frame is reflected.

The compensation method determiner 123*b* may compare accumulated data SP for each of the pixels PX with first reference data SP1 and second reference data SP2. The first reference data SP1 and the second reference data SP2 may be reference data for determining whether to switch from one compensation method to another compensation method, and the second reference data SP2 may be greater than the second reference data SP1. For example, in response to the accumulated data SP being less than the first reference data SP1, the compensation method determiner 123*b* may choose to use the first compensation method CP1 only, and may generate compensated image data DATA1 by applying the first compensation method CP1. In response to the accumulated data SP being greater than the first reference data SP1, and less than the second reference data SP2, the compensation method determiner 123*b* may choose to use both the first and second compensation methods CP1 and CP2. In response to the accumulated data SP being greater than the second reference data SP2, the compensation method determiner 123*b* may choose to use the second compensation method CP2 only. The accumulated data SP may vary from one pixel PX to another pixel PX.

Accordingly, a degradation compensation method to compensate for the degradation of the OLED "EL" of each of the pixels PX may differ from one pixel PX to another pixel PX. For example, referring to FIG. 6, different compensation methods may be applied to pixels in a first region 110*a* that is severely degraded, pixels in a second region 110*b* that is degraded, but not as severely as the first region 110*a*, and pixels in a third region 110*c* that is not yet much degraded. However, the classification of the first, second and third regions n 110*a*, 110*b* and 110*c* as illustrated in FIG. 6 is exemplary, and the pattern of the degradation of the pixels is not limited to that set forth in FIG. 6. The second compensation method CP2 may be applied to the first region 110*a*, the first and second compensation methods CP1 and CP2 may both be applied to the second region 110*b*, and the first compensation method CP1 may be applied to the third region 110*c*. The compensation method determiner 123*b* may provide compensation determination data CD, which indicates a degradation compensation method determined to compensate for image data DATA input to each of the pixels PX, and the accumulated data SP, which is to compensate for the image data DATA input to each of the pixels PX.

The data compensator 123*c* may receive the sensing data from the sensing unit 150, and may receive the compensation determination data CD and the accumulated data SP from the data compensator 123*c*. The data compensator 123*c* may generate compensated image data DATA1 by compensating for the image data DATA input to each of the pixels PX using the degradation compensation method indicated by the compensation determination data CD. The data compensator 123*c* may calculate a compensation amount for each of the pixels PX according to the degradation compensation method determined by the compensation method determiner 123*b*, and may generate the compensated image data DATA1 using the compensation amount. In a case when the first and second compensation methods CP1 and CP2 are both determined to be used, a final compensation amount ΔST may be calculated using the following equation: $\Delta ST=(1-S')\times\Delta SP+(S')\times\times SD$, where ΔSP denotes a compensation amount determined based on the accumulated data SP, ×SD denotes a compensation amount determined based on the sensing data SD, and S' denotes a constant determined based on the accumulated data SP as of the current frame. In an exemplary embodiment, the constant S' may be calculated by the following equation: $S'=(SP-SP1)/(SP2-SP1)$, where SP1 denotes the first reference data and SP2 denotes the second reference data. The accumulated data-based compensation amount ΔSP may be calculated using a lookup table, which shows a compensation amount ΔSP for each given accumulated data SP, or using an equation having the accumulated data SP as a variable. The sensing data-based compensation amount ΔSD may also be calculated using a lookup table or an equation. The data compensator 123*c* may provide the compensated image data DATA1 to the data driving unit 130.

The data driving unit 130 may generate the data voltages D1 through Dm based on the compensated image data DATA1, and may provide the data voltages D1 through Dm to the display unit 110. Accordingly, each of the pixels PX may be provided with a data voltage corresponding to compensated image data obtained by the aforementioned compensation method. As a result, any luminance irregularity caused by the degradation of the OLED "EL" of each of the pixels PX may be improved (e.g., reduced or compensated for), and the organic light-emitting display device 10 may provide an improved quality of display.

A driving method of an organic light-emitting display device, according to an exemplary embodiment of the present invention, will hereinafter be described.

Figure 7:
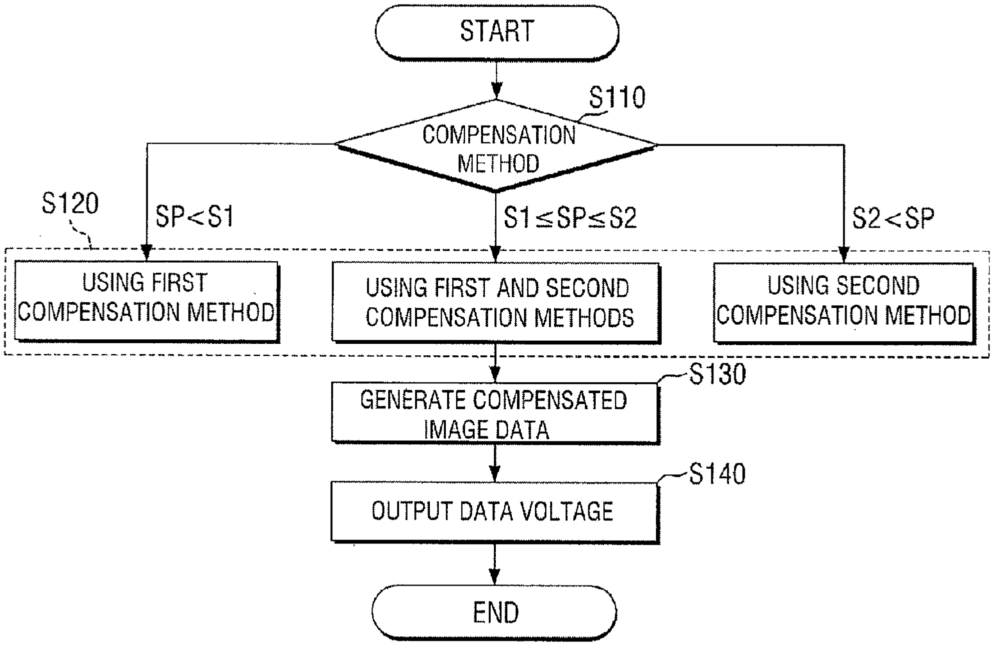
FIG. 7 is a flow diagram illustrating a driving method of an organic light-emitting display device, according to an exemplary embodiment of the present invention.

FIG. 7 is a flow diagram illustrating a driving method of an organic light-emitting display device, according to an exemplary embodiment of the present invention. For a better understanding, the driving method of an organic light-emitting display device, according to an exemplary embodiment of the present invention, will hereinafter be described with reference to FIG. 7 and further reference to FIGS. 1 to 6.

The driving method of an organic light-emitting display device, according to an exemplary embodiment of the present invention, may include determining a degradation compensation method to be used (S110), calculating a compensation amount (S120), generating compensated image data (S130), and outputting a plurality of data voltages (S140).

The driving method of an organic light-emitting display device, according to an exemplary embodiment of the present invention, may be applicable to the organic light-emitting display device 10 of FIGS. 1 to 6. For convenience, a detailed description of the organic light-emitting display device 10 may not be provided.

A degradation compensation method to compensate for the degradation of the OLED "EL" of each of the pixels is determined (S110).

For example, a first compensation method CP1 may be a stress profiler compensation method using accumulation data SP, and a second compensation method CP2 may be a direct measurement-based compensation method using sensing data SD. The first compensation method CP1 may provide a high compensation precision when the OLED "EL" of each of the pixels PX is not much degraded, and the second compensation method CP2 may provide a high compensation precision when the OLED "EL" of each of the pixels PX is severely degraded. The degradation of the OLED "EL" of each of the pixels PX may be proportional to the amount of accumulated data SP. In the driving method of an organic light-emitting display device, according to an exemplary embodiment of the present invention, a degradation compensation method to compensate for the OLED "EL" of each of the pixels PX may be determined based on the accumulated data SP. A high compensation precision can be uniformly provided by switching from one compensation method to another compensation method according to the amount of accumulated data SP, rather than according to the amount of time for which the OLED "EL" of each of the pixels PX is driven. The first and second compensation methods CP1 and CP2 may produce different compensation amounts, and, as a result, luminance irregularity may occur during the switching from the first switching method CP1 to the second switching method CP2. To reduce or prevent such luminance irregularity, a transitional period during which the first and second compensation methods CP1 and CP2 may both be used may be provided during the switching from the first compensation method CP1 to the second switching method CP2.

A degradation compensation method to compensate for the OLED "EL" of each of the pixels PX may be determined by comparing accumulated data SP for each of the pixels PX with first reference data SP1 and second reference data SP2. The first reference data SP1 and the second reference data SP2 may be reference data for determining whether to switch from one compensation method to another compensation method, and the second reference data SP2 may be greater than the second reference data SP1. The accumulated data SP may be obtained by accumulating image data DATA of previous frames and a current frame. The accumulated data SP may vary from one pixel PX to another pixel PX. Accordingly, the degradation compensation method may differ from one pixel PX to another pixel PX. For example, in response to the accumulated data SP being less than the first reference data SP1, the first compensation method CP1 may be determined as the degradation compensation method to be used. In response to the accumulated data SP being greater than the first reference data SP1, and less than the second reference data SP2, the first and second compensation methods CP1 and CP2 may both be determined as the degradation compensation method to be used. In response to the accumulated data SP being greater than the second reference data SP2, the second compensation method CP2 may be determined as the degradation compensation method to be used.

Thereafter, a compensation amount is calculated (S120).

For example, a compensation amount may be calculated according to the degradation compensation method to be used. In a case when only the first compensation method CP1 is used, an accumulated data-based compensation amount ΔSP may be calculated. In a case when only the second compensation method CP2 is used, a sensing data-based compensation amount ΔSD may be calculated. In a case when the first and second compensation methods CP1 and CP2 are both used, a final compensation amount ΔST may be calculated using the following equation: $\Delta ST=(1-S')\times\Delta SP+(S')\times\Delta SD$ where S' denotes a constant determined based on the accumulated data SP as of the current frame. In an exemplary embodiment, the constant S' may be calculated using the following equation: $S'=(SP-SP1)/(SP2-SP1)$.

Thereafter, compensated image data is generated (S130), and a plurality of data voltages are output (S140). For example, compensated image data DATA1 may be obtained by applying the compensation amount determined for each of the pixels PX to the image data DATA. The image compensator 123 of the control unit 120 may provide the compensated image data DATA1 to the data driving unit 130. The data driving unit 130 may generate a plurality of data voltages D1 through Dm by sampling and holding the compensated image data DATA1 input thereto according to a first driving control signal CONT1 and converting the sampled-and-held image data into analog voltage data. The data driving unit 130 may transmit the data voltages D1 through Dm to the data lines DL1 through DLm, respectively. Each of the pixels PX of the display unit 110 may be turned on by one of a plurality of scan signals S1 through Sn with a gate-on voltage, may be provided with one of the data voltages D1 through Dm, and may thus emit light corresponding to the data voltage provided thereto. That is, each of the pixels PX may be provided with a data voltage corresponding to compensated image data obtained by the degradation compensation method determined to be used. As a result, any luminance irregularity caused by the degradation of the OLED "EL" of each of the pixels PX may be improved (e.g., reduced or compensated for), and the driving method of an organic light-emitting display device, according to an exemplary embodiment of the present invention, may provide an improved quality of display.

While the present invention has been particularly shown and described with reference to exemplary embodiments thereof, it will be understood by those of ordinary skill in the art that various suitable changes may be made therein without departing from the spirit and scope of the present invention as defined by the following claims, and equivalents thereof. The exemplary embodiments should be considered in a descriptive sense only and not for purposes of limitation.

What is claimed is:

1. An organic light-emitting display device, comprising:

a display unit comprising a plurality of pixels each having an organic light-emitting diode (OLED);

a controller configured to accumulate image data of each frame and to generate compensated image data using a degradation compensation method determined, based on the accumulated image data, to compensate for the degradation of the OLED of each of the pixels; and a data driver configured to generate a data voltage according to the compensated image data and to provide the data voltage to the pixels, wherein the controller is configured to determine at least one of a first compensation method and a second compensation method as the degradation compensation method based on the accumulated image data, wherein the first compensation method uses sensing data corresponding to a degree of the degradation of the OLED of each of the pixels, and the second compensation method uses the accumulated image data, and wherein the controller is configured to determine both the first and second compensation methods as the degradation compensation method in response to the accumulated image data being greater than first reference data and less than second reference data.

2. The organic light-emitting display device of claim 1, further comprising:

a sensor configured to generate the sensing data by sensing the degree of the degradation of the OLED of each of the pixels.

3. The organic light-emitting display device of claim 1, wherein the controller is configured to determine the first compensation method as the degradation compensation method in response to the accumulated image data being less than the first reference data, and to determine the second compensation method as the degradation compensation method in response to the accumulated image data being greater than the second reference data, wherein the second reference data is greater than the first reference data.

4. The organic light-emitting display device of claim 1, wherein in response to the first and second compensation methods both being determined as the degradation compensation method, the controller is further configured to calculate a final compensation amount by adding up a compensation amount produced by the first compensation method and a compensation amount produced by the second compensation method according to a rate calculated based on the accumulated image data, and to generate the compensated image data using the final compensation amount.

5. The organic light-emitting display device of claim 4, wherein the rate is calculated by dividing a difference between the accumulated image data and the first reference data by a difference between the second reference data and the first reference data.

6. The organic light-emitting display device of claim 1, wherein a sensor is configured to generate the sensing data by applying a sensing voltage to each of the pixels and measuring a current flowing in the OLED of each of the pixels according to the sensing voltage.

7. The organic light-emitting display device of claim 1, further comprising:

a sensor configured to generate the sensing data by sensing the degree of the degradation of the OLED of each of the pixels, wherein the controller is configured to switch from a first compensation method to a second compensation method, in response to the accumulated image data continuing to be accumulated, wherein the first compensation method uses the sensing data and the second compensation method uses the accumulated image data.

8. The organic light-emitting display device of claim 7, wherein the controller is configured to provide a transitional period during which the first and second compensation methods are both used during the switching from the first compensation method to the second compensation method.

9. The organic light-emitting display device of claim 1, wherein the controller comprises an image processor and an image compensator, wherein the image processor is configured to process an image signal provided thereto from an external source into the image data, and the image compensator is configured to generate the compensated image data by compensating for the image data.

10. The organic light-emitting display device of claim 9, wherein the image compensator comprises a data accumulator and a compensation method determiner, wherein the data accumulator is configured to store the image data therein, and the compensation method determiner is configured to determine the degradation compensation method according to the accumulated image data.

11. A driving method of an organic light-emitting display device comprising a plurality of pixels each having an OLED, the driving method comprising:

accumulating image data of each frame and determining a degradation compensation method based on the accumulated image data;

calculating a compensation amount for each of the pixels based on the determined degradation compensation method;

generating compensated image data by compensating for the image data according to the calculated compensation amount; and generating a data voltage based on the compensated image data, wherein the determining the degradation compensation method comprises determining at least one of a first compensation method and a second compensation method as the degradation compensation method to be used based on the accumulated image data, wherein the first compensation method uses sensing data obtained by measuring a degree of degradation of the OLED of each of the pixels, and the second compensation method uses the accumulated image data, and wherein both the first and second compensation methods are determined as the degradation compensation method to be used in response to the accumulated image data being greater than first reference data and less than second reference data.

12. The driving method of claim 11, wherein the first compensation method is determined as the degradation compensation method to be used in response to the accumulated image data being less than first reference data, and the second compensation method is determined as the degradation compensation method to be used in response to the accumulated image data being greater than second reference data, and wherein the second reference data is greater than the first reference data.

13. The driving method of claim 11, wherein in response to the first and second compensation methods both being determined as the degradation compensation method to be used, a final compensation amount is calculated by adding up a compensation amount produced by the first compensation method and a compensation amount produced by the second compensation method according to a rate calculated based on the accumulated image data, and the compensated image data is generated using the final compensation amount.

14. The driving method of claim 13, wherein the rate is calculated by dividing a difference between the accumulated image data and first reference data by a difference between second reference data and the first reference data.

15. The driving method of claim 11, further comprising:

switching from a first compensation method to a second compensation method, wherein the first compensation method uses the sensing data that is obtained by measuring a degree of degradation of the OLED of each of the pixels, and the second compensation method uses the accumulated image data, in response to the accumulated image data continuing to be accumulated.

16. The driving method of claim 15, wherein the switching from the first compensation method to the second compensation method comprises providing a transitional period during which the first and second compensation methods are both used during the switching from the first compensation method to the second compensation method.

17. The driving method of claim 15, wherein the sensing data is obtained by applying a sensing voltage to each of the pixels and measuring a current flowing in the OLED of each of the pixels according to the sensing voltage.

* * * * *